United States Patent
Lee et al.

(10) Patent No.: US 7,354,534 B2
(45) Date of Patent: Apr. 8, 2008

(54) COMPOSITION FOR OVERCOAT LAYER OF ORGANOPHOTORECEPTOR, ORGANOPHOTORECEPTOR MANUFACTURED BY EMPLOYING THE SAME AND THE ELECTROPHOTOGRAPHIC IMAGING APPARATUS CONTAINING THE SAME

(75) Inventors: Nam-jeong Lee, Suwon-si (KR); Saburo Yokota, Suwon-si (KR); Kyung-yol Yon, Seongnam-si (KR); Hwan-koo Lee, Suwon-si (KR); Hae-ree Joo, Seoul (KR); Boom-jun Kim, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 11/541,700

(22) Filed: Oct. 3, 2006

(65) Prior Publication Data

US 2007/0026331 A1 Feb. 1, 2007

Related U.S. Application Data

(63) Continuation of application No. 10/681,324, filed on Oct. 9, 2003, now Pat. No. 7,172,843.

(30) Foreign Application Priority Data

Oct. 9, 2002 (KR) .............. 2000-61490

(51) Int. Cl.
*H01B 1/00* (2006.01)
*H01B 1/06* (2006.01)
*G03G 15/04* (2006.01)

(52) U.S. Cl. .............. 252/511; 252/500; 430/66

(58) Field of Classification Search ............ 252/500, 252/511; 430/66
See application file for complete search history.

(56) References Cited

U.S. PATENT DOCUMENTS

| | | | | |
|---|---|---|---|---|
| 4,562,132 A | * | 12/1985 | Ong et al. | 430/58.25 |
| 5,464,924 A | * | 11/1995 | Silvis et al. | 528/102 |
| 5,834,147 A | | 11/1998 | Nagae et al. | 430/67 |
| 6,689,522 B2 | | 2/2004 | Yamazaki et al. | 430/45 |
| 6,949,322 B2 | * | 9/2005 | Lee et al. | 430/66 |
| 7,115,346 B2 | * | 10/2006 | Yokota et al. | 430/58.45 |
| 7,172,843 B2 | * | 2/2007 | Lee et al. | 430/66 |
| 2001/0005572 A1 | * | 6/2001 | Lobo et al. | 430/350 |
| 2002/0025184 A1 | | 2/2002 | Ishikawa et al. | 399/111 |
| 2003/0148098 A1 | | 8/2003 | Shafi et al. | 428/375 |

* cited by examiner

*Primary Examiner*—Mark Kopec
*Assistant Examiner*—Jaison Thomas
(74) *Attorney, Agent, or Firm*—Staas & Halsey LLP

(57) ABSTRACT

A composition for an overcoat layer suitable for use in an organophotoreceptor for liquid toner, an organophotoreceptor manufactured by employing the composition and an electrophotographic imaging apparatus containing the organophotoreceptor. Since the organophotoreceptor can maintain higher charge potential and low residual or discharge potential, the lifetime of the organophotoreceptor can be extended. Also, since the organophotoreceptor has good solvent resistance and abrasion resistance, it can be advantageously used for liquid toner.

4 Claims, 1 Drawing Sheet

IMAGE FORMING APPARATUS

COMPOSITION FOR OVERCOAT LAYER OF ORGANOPHOTORECEPTOR, ORGANOPHOTORECEPTOR MANUFACTURED BY EMPLOYING THE SAME AND THE ELECTROPHOTOGRAPHIC IMAGING APPARATUS CONTAINING THE SAME

CROSS-REFERENCE TO RELATED APPLICATIONS

This application is a Continuation of application Ser. No. 10/681,324 filed Oct. 9, 2003 now U.S. Pat. No. 7,172,843, the disclosure of which is herein incorporated by reference, and claims the benefit of Korean Patent Application No. 2002-61490, filed Oct. 9, 2002, in the Korean Intellectual Property Office, the disclosure of which is incorporated herein by reference.

BACKGROUND OF THE INVENTION

1. Field of the Invention

The present invention relates to a composition for an overcoat layer of an organophotoreceptor, an organophotoreceptor manufactured by employing the same and an electrophotographic imaging apparatus containing the same. More specifically, the invention relates to a composition for an overcoat layer suitable for use in an organophotoreceptor for liquid toner, the composition having good electrical properties and increased abrasion resistance and adhesion to extend the lifetime of an organophotoreceptor. The present invention also relates to an organophotoreceptor manufactured by employing the composition and an electrophotographic imaging apparatus containing the organophotoreceptor.

2. Description of the Related Art

In electrophotography, an organophotoreceptor has an electrically insulating photoconductive element on an electrically conductive substrate and may be in the form of a plate, disk, sheet, belt, drum or the like. An electrophotographic imaging process using the organophotoreceptor will now be described briefly.

First, the surface of an organophotoreceptor having an electrically conductive substrate where a charge transport material and charge generating material are provided is electrostatically charged, and then the charged surface is imagewise exposed to light. The light exposure selectively dissipates the charge in illuminated areas, thereby forming a pattern of charged and uncharged areas. Finally, a toner is then deposited on the surface to create a toner image on the surface of the substrate. The resulting toner image can be transferred to a suitable receiving surface such as paper. The imaging process may be repeated many times.

Both single layer and multilayer photoconductive elements have been used. In single layer embodiments, a charge transport material and charge generating material are combined with a polymeric binder and then deposited on the electrically conductive substrate. In multilayer embodiments, the charge transport material and charge generating material are in the form of separate layers, each of which can optionally be combined with a polymeric binder, deposited on the electrically conductive substrate. Two arrangements are possible. In one arrangement (the "dual layer" arrangement), the charge generating layer is deposited on the electrically conductive substrate and the charge transport layer is deposited on top of the charge generating layer. In an alternate arrangement (the "inverted dual layer" arrangement), the order of the charge transport layer and charge generating layer is reversed.

In both the single and multilayer photoconductive elements, the purpose of the charge generating material is to generate charge carriers (i.e., holes and/or electrons) upon exposure to light. The purpose of the charge transport compound is to accept at least one type of these charge carriers and transport them through the photosensitive layer in order to facilitate discharge of a surface charge on the photoconductive element.

An organophotoreceptor may be easily worn due to friction between toner and a roller or a cleaning blade, which decreases the thickness of the organophotoreceptor, resulting in a reduction in lifetime. To overcome this problem, an overcoat layer may be formed on the organophotoreceptor.

In recent years, there has been an increase in the development of electrophotographic printers using liquid toners, making it is necessary to develop organophotoreceptors for liquid toners. However, conventional overcoat layers have been proposed to extend the lifetime of an organophotoreceptor for dry toner. Therefore, there is still growing demand for overcoat layers that can extend the lifetime of an organophotoreceptor suitable for liquid toners, having improved electrical and mechanical properties.

SUMMARY OF THE INVENTION

According to an aspect of the present invention there is provided a composition for an overcoat layer of an organophotoreceptor, which can improve electrical, and mechanical properties as well as increase the lifetime of the organophotoreceptor suitable for liquid toner.

Additional aspects and advantages of the invention will be set forth in part in the description which follows and, in part, will be obvious from the description, or may be learned by practice of the invention.

In an aspect of the present invention, there is provided a coating composition for an overcoat layer of an organophotoreceptor comprising polyaminoether, an electron transport material and an alcoholic solvent.

The polyaminoether is preferably hydroxylated polyaminoether.

The polyaminoether is represented by the following formula, and is contained in an amount of 70 to 99 parts by weight based on 100 parts by weight of the solid content of an overcoat layer:

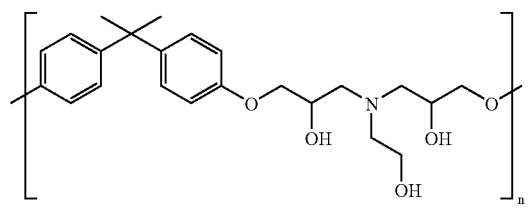

wherein n is an integer from 10 to 400.

The electron transport material may contain an electron transport material represented by the following formula:

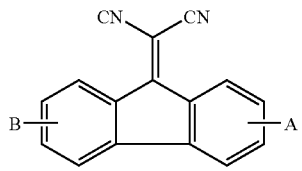

wherein A and B are independently one selected from the group consisting of a hydrogen atom, a halogen atom, a C2~C30 substituted or unsubstituted alkoxycarbonyl group or a C2~C30 substituted or unsubstituted alkylaminocarbonyl group, and the hydrogen atom in the benzene ring can be substituted by halogen atom(s).

Examples of the alcoholic solvents include, but are not limited to, 1-methoxy-2-propanol, methanol, ethanol, propanol, butanol and isopropanol, and are contained in an amount of 70 to 99 parts by weight based on 100 parts by weight of the coating composition for an overcoat layer.

In another aspect of the present invention, there is provided an organophotoreceptor comprising an electrically conductive substrate, a photosensitive layer formed on the electrically conductive substrate, and an overcoat layer formed by coating the composition for an overcoat layer on the photosensitive layer and drying.

The overcoat layer may have a thickness of 0.01 to 5 μm, and the photosensitive layer may be a single layer having both a charge generating material and a charge transport material or a double layer in which a charge generating layer containing a charge generating material and a charge transport layer containing a charge transport material are laminated.

In still another aspect of the present invention, there is provided an electrophotographic imaging apparatus comprising a plurality of support rollers, and an organophotoreceptor operably coupled to the support roller with motion of the support rollers resulting in motion of the organophotoreceptor, wherein the organophotoreceptor comprises an electrically conductive substrate, a photosensitive layer formed on the electrically conductive substrate, and an overcoat layer formed by coating the composition for an overcoat layer on the photosensitive layer and drying.

BRIEF DESCRIPTION OF THE DRAWINGS

These and/or other aspects of the invention will become apparent and more readily appreciated from the following description f the preferred embodiments taken in conjunction with the accompanying drawings of which.

DETAILED DESCRIPTION OF THE PREFERRED EMBODIMENTS

Figure 1:
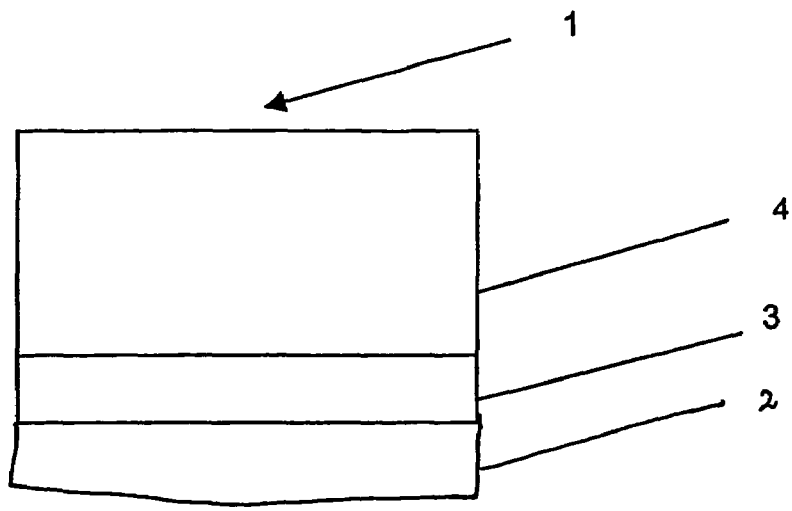
FIG. 1 is a diagram illustrating (not to scale) an organophotoreceptor.

Reference will now be made in detail to the aspects of the present invention, examples of which are illustrated in the accompanying drawings, wherein like reference numerals refer to like elements throughout. The aspects are described below in order to explain the present invention by referring to the figures.

FIG. 1 is a diagram illustrating (not to scale) an organophotoreceptor 1 comprising an electrically conductive substrate 2, a photosensitive layer 3 formed on the electrically conductive substrate 2, and an overcoat layer 4 formed on the photosensitive layer 3.

A coating composition for an overcoat layer suitable for use in the organophotoreceptor according to the present invention, wherein the organophotoreceptor comprises an overcoat layer manufactured by employing the composition and an electrophotographic imaging apparatus using the organophotoreceptor, will now be described in detail.

The present invention provides a coating composition for an overcoat layer for an organophotoreceptor comprising polyaminoether, an electron transport material and an alcoholic solvent.

The polyaminoether, a polymer having good oxygen permeation resistance, may be a hydroxylated polyaminoether, preferably, a compound represented by the following formula:

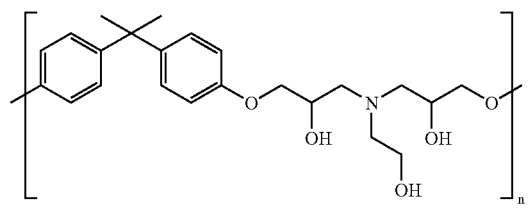

wherein n is an integer from 10 to 400, preferably 10 to 90.

Preferably, the polyaminoether represented by the above formula has a weight average molecular weight in the range of 4,000 to 160,000. If the weight average molecular weight of the polyaminoether represented by the above formula is out of the range specified above, coating of the composition for an overcoat layer is difficult to achieve or solubility of the alcoholic solvent is undesirably poor.

The electron transport material is exemplified by a compound represented by the following formula:

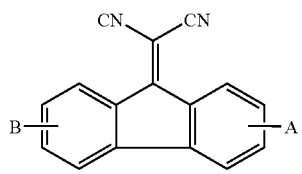

wherein A and B are independently one selected from the group consisting of a hydrogen atom, a halogen atom, a C2~C30 substituted or unsubstituted alkoxycarbonyl group or a C2~C30 substituted or unsubstituted alkylaminocarbonyl group, and the hydrogen atom in the benzene ring is substitutable by halogen atom(s). The number of carbon atoms in the substituted or unsubstituted alkoxycarbonyl group or the substituted or unsubstituted alkylaminocarbonyl group is preferably in the range of 2 to 15, more preferably 2 to 8.

The above compound may be exemplified by the following formulas:

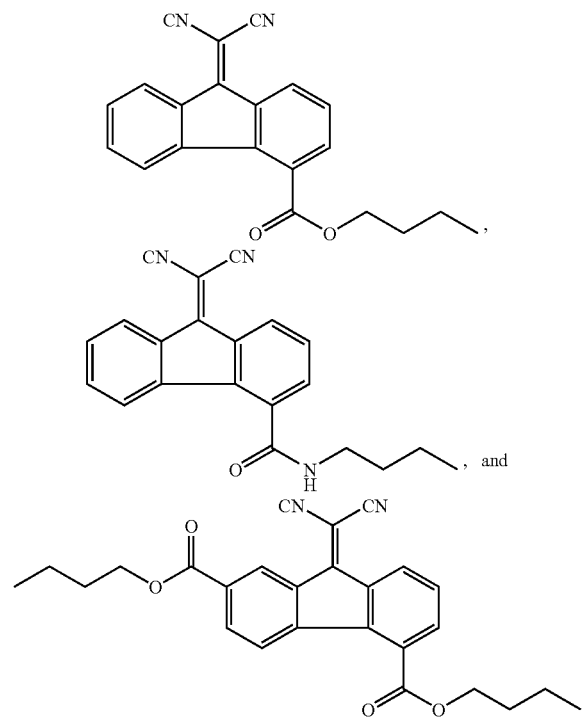

The electron transport material that can be used for the organophotoreceptor according to the present invention is not limited to those stated herein and can be used alone or in a mixture of two or more kinds of those compounds.

The amount of the electron transport material may be in the range of 0.1 to 50 parts by weight, preferably 1 to 30 parts by weight, based on 100 parts by weight of the solid content of an overcoat layer. If the amount of the electron transport material is less than 0.1 parts by weight, the electron transporting capability of the overcoat layer decreases, deteriorating electrostatic properties of the organophotoreceptor. If the amount of the electron transport material is greater than 50 parts by weight, abrasion resistance of the overcoat layer may be lowered or solubility of the electron transport material may be undesirably poor.

The coating composition for an overcoat layer according to the present invention includes a solvent. Any solvent that can dissolve polyaminoether can be used, and an alcoholic solvent is preferred. Examples of the solvent include at least one selected from the group consisting of 1-methoxy-2-propanol, methanol, ethanol, propanol, butanol and isopropanol. Preferably, 1-methoxy-2-propanol is used alone or a mixed-solvent containing 1-methoxy-2-propanol and at least one alcoholic solvent selected from the group consisting of methanol, ethanol, butanol and isopropanol, is used. The solvent is preferably contained in an amount of 70 to 99 parts by weight based on 100 parts by weight of the coating composition for an overcoat layer. If the amount of the solvent is less than 70 parts by weight, the overcoat layer is excessively thick, and an exposure potential of the organophotoreceptor becomes high and a residual potential and an exposure potential sharply increase during charge-exposure-erase cycling. If the amount of the solvent is greater than 99 parts by weight, the overcoat layer is overly thin, resulting in the deterioration of mechanical properties of the overcoat layer, such that it may be easily worn. Also, if the amount of the solvent is less than the range specified above, solubility of the solvent is undesirably poor. If the amount of the solvent is greater than the range specified above, coating of the composition for an overcoat layer is difficult to achieve and the overcoat layer is too thin to function properly.

In the case of using the mixed-solvent consisting of 1-methoxy-2-propanol and at least one alcoholic solvent, the alcoholic solvent is preferably used in an amount of 1 to 30 parts by weight based on 100 parts by weight of total content of 1-methoxy-2-propanol.

In another aspect of the present invention, there is provided an organophotoreceptor having improved electrical, and mechanical properties as well as an increased lifetime by employing the overcoat layer manufactured from the composition.

The organophotoreceptor according to the present invention includes an electrically conductive substrate, a photosensitive layer formed on the electrically conductive substrate, and an overcoat layer formed by coating the composition for an overcoat layer on the photosensitive layer and drying.

Preferably, the photosensitive layer includes a charge transport layer formed on the electrically conductive substrate and a charge generating layer formed on the charge transport layer.

The overcoat layer preferably has a thickness of 0.01 to 5 µm. If the thickness of the overcoat layer is less than 0.01 µm, the overcoat layer is not effective in protecting underlying layers. If the thickness of the overcoat layer is greater than 5 µm, electrical properties thereof, including an increased exposure potential, may undesirably deteriorate.

The photosensitive layer may have a single layer with both a charge transport material and a charge generating material or may have a double layer in which a charge generating layer, containing a charge generating material, and a charge transport layer, containing a charge transport material, are laminated.

A method of manufacturing an electrophotographic organophotoreceptor using the composition for an overcoat layer according to the present invention will now be described.

A photosensitive layer is first formed on an electrically conductive substrate. Here, the photosensitive layer may be formed by sequentially laminating a charge transport layer containing a charge transport material and a charge generating layer containing a charge generating material or laminating these layers vice-versa. Alternatively, a single-layer photosensitive layer containing both a charge transport material and a charge generating material may be formed.

The charge transport layer is formed by coating a composition comprising a charge transport material, a binder and an organic solvent and thereafter drying the layer. The charge generating layer is formed by coating a composition comprising a charge generating material, a binder and an organic solvent and thereafter drying the layer.

Examples of the charge transport material include, but are not limited to, pyrazoline derivatives, fluorene derivatives, oxadiazole derivatives, stilbene derivatives, hydrazone derivatives, carbazole hydrazone derivatives, triaryl amines, polyvinyl carbazole, polyvinyl pyrene, and polyacenaphthylene.

Examples of the charge generating material include, but are not limited to, metal-free phthalocyanine (e.g., Progen 1x-form metal-free phthalocyanine, ZENECA INC.), and metal phthalocyanine such as titanium phthalocyanine, copper phthalocyanine, titanyloxy phthalocyanine, or hydroxygallium phthalocyanine.

The charge transport material may be used in a generally accepted amount, that is, in an amount of 35 to 65 parts by weight based on 100 parts by weight of the composition for forming the charge transport layer. The charge generating material may be used in an amount of 55 to 85 parts by weight based on 100 parts by weight of the composition for forming the charge generating layer.

The binder may dissolve or disperse the charge transport material or charge generating material, and examples thereof include, but are not limited to, polyvinyl butyral, polycarbonate, poly(styrene-co-butadiene), modified acryl polymer, polyvinyl acetate, styrene-alkyd resin, soya-alkyl resin, polyvinyl chloride, polyvinylidene chloride, polyacrylonitrile, polyacrylic acid, polyacrylates, polymethacrylates, styrene-based polymers, alkyd resin, polyamides, polyurethanes, polyesters, polysulfones, polyethers and mixtures thereof. In the present invention, polycarbonate or polyvinyl butyral is preferably used. The binder is used in an amount of 15 to 65 parts by weight, based on 100 parts by weight of the composition for forming the charge generating layer or the charge transport layer.

Examples of the organic solvent used for the charge transport layer forming composition or charge generating layer forming composition include, but are not limited to, tetrahydrofuran, methylene chloride, chloroform, dichloroethane, trichloroethane, chlorobenzene, and acetate-based solvent. The amount of the organic solvent may be in a range of 70 to 99 parts by weight based on 100 parts by weight of the composition for forming the charge generating layer or the charge transport layer.

The charge transport layer forming composition or the charge generating layer forming composition may be coated in accordance with any appropriate technique known in the art without limitation. In the case where the electrically conductive substrate is a drum-like substrate, ring coating or dip coating is preferably used.

As described above, after the photosensitive layer is formed on the electrically conductive substrate, the composition for an overcoat layer according to the present invention is coated on the photosensitive layer and dried, thereby completing the organophotoreceptor according to the present invention. The drying is performed at 80 to 140° C., preferably at 100 to 130° C.

The composition for an overcoat layer may be coated by spin coating, dip coating or ring coating. In the case where the electrically conductive substrate is a drum-like substrate, ring coating or dip coating is preferably used.

In the organophotoreceptor according to the present invention, the overall thickness of the photosensitive layer may be between 5.1 to 26 μm. The thickness of the charge generating layer is in the range of 0.1 to 1.0 μm, the thickness of the charge transport layer is in the range of 5 to 25 μm, and the thickness of the electrically conductive substrate, in particular, the drum-like substrate, is generally in the range of 0.5 to 2 mm. The overcoat layer has a thickness of 0.01 to 5 μm, as described above.

The organophotoreceptor according to the present invention may further include additional layers. These additional layers are widely known layers, for example, a charge blocking layer. The charge blocking layer may inhibit charge infusion from the electrically conductive substrate to the photosensitive layer or may enhance adhesion between the electrically conductive substrate and the photosensitive layer.

In the electrophotographic imaging process using the organophotoreceptor, the toner can be either a dry toner or a liquid toner.

If the conventional organophotoreceptor for dry toner is employed in electrophotography using liquid toner, the organophotoreceptor contacts a paraffinic solvent, a component of liquid toner, resulting in cracking or crazing or partial elution of components of the organophotoreceptor.

On the other hand, since the organophotoreceptor according to the present invention is highly resistant to a paraffinic solvent, it can be used for an electrophotographic imaging process using liquid toner and the various problems associated with the prior art can be avoided. Also, the organophotoreceptor according to the present invention exhibits good abrasion resistance in the presence of liquid toner.

Figure 2:
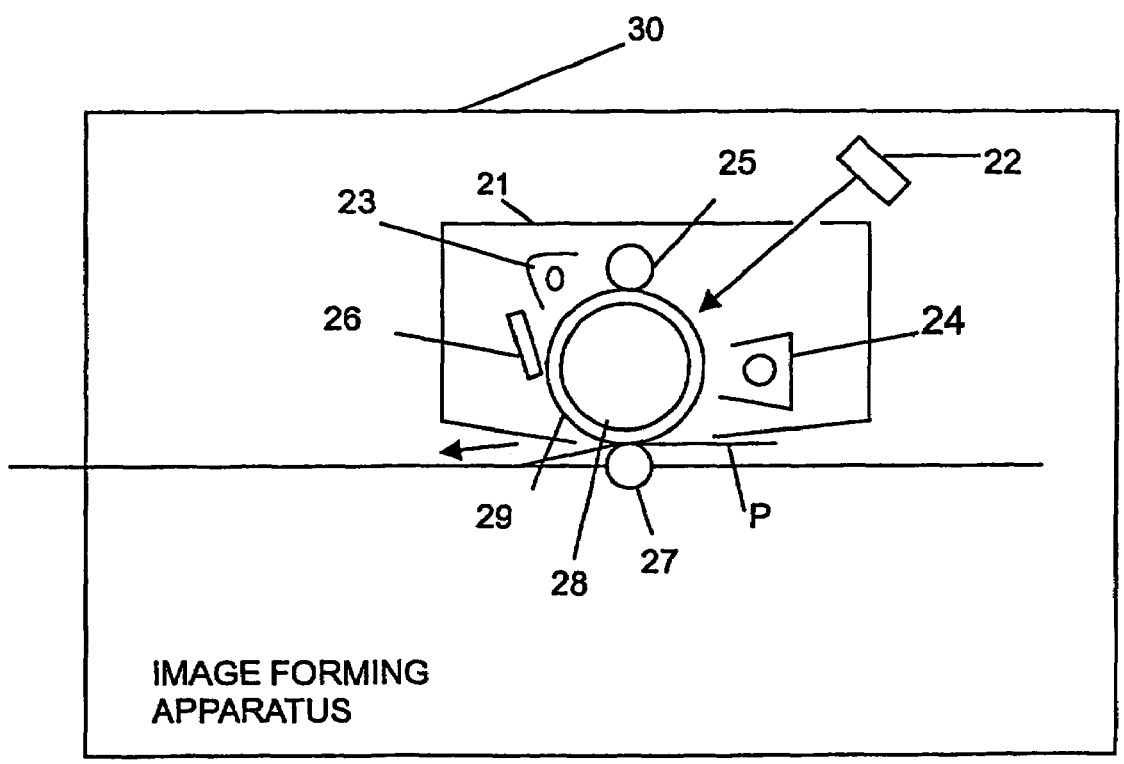
FIG. 2 is a schematic representation of an electrophotographic imaging apparatus.

FIG. 2 is a schematic representation of an electrophotographic imaging apparatus 30. The electrophotographic imaging apparatus 30 includes an organophotoreceptor unit. The organophotoreceptor unit generally includes a drum 28 that is attachable to and detachable from the electrophotographic apparatus 30, and an organophotoreceptor 29 disposed on the drum 28. The imaging apparatus further includes a charging device 25 which charges the organophotoreceptor unit, an imagewise light irradiating device 22 which irradiates the charged organophotoreceptor unit with imagewise light to form an electrostatic latent image with a toner to form a toner image on the organophotoreceptor unit, and a transfer device 27, which transfers the toner image onto a receiving material, such as paper P. The charging device 25 may be supplied with a voltage as a charging unit and may contact and charge the organophotoreceptor 29. Where desired, the apparatus may also include a pre-exposure unit 23 to erase residual charge on the surface of the organophotoreceptor 29 to prepare for a next cycle. The imaging apparatus further includes an electrophotographic cartridge 21, a developing device 24 which develops an electrostatic latent image formed on the organophotoreceptor 29, and a cleaning device 26 which cleans a surface of the organophotoreceptor 29.

The electrophotographic imaging apparatus according to the present invention also comprises a plurality of support rollers (not shown), and an organophotoreceptor operably coupled to the support rollers where motion of the support rollers results in motion of the organophotoreceptor. The organophotoreceptor comprises an electrically conductive substrate, a photosensitive layer formed on the electrically conductive substrate, and an overcoat layer formed by coating the composition for an overcoat layer on the photosensitive layer and drying the layer.

An electrophotographic imaging process using the organophotoreceptor according to the present invention will now be described.

First, the surface of an organophotoreceptor having an electrically conductive substrate, where a charge transport material and a charge generating material are provided, is uniformly electrostatically charged, and thereafter the charged surface is imagewise exposed to light. The light exposure selectively dissipates the charge in illuminated areas, thereby forming a pattern of charged and uncharged areas. Finally, a liquid or dry toner is deposited on the surface to create a toner image on the surface of the substrate. The resulting toner image can be transferred to a suitable receiving surface such as paper. The imaging process may be repeated many times.

The liquid toner is prepared by dispersing a colorant, a binder resin, a charge control agent and the like in a liquid carrier.

Examples of the liquid carrier include aliphatic hydrocarbons such as n-pentane, hexane or heptane, alicyclic hydrocarbons such as cyclopentane or cyclohexane, aromatic hydrocarbons such as benzene, toluene or xylene, halogenated aliphatic hydrocarbons such as chlorinated alkane, fluorinated alkane or chlorofluorocarbon, silicon oils or mixtures thereof. Specifically, aliphatic hydrocarbon solvents, in particular, paraffin solvent mixtures such as ISOPAR G, H, L, K, V or M, or NORPAR 12, 13, or 15 (Trade name) available from EXXON, are preferably used. The amount of the solvent is 5 to 100 parts by weight based on 1 part by weight of the colorant.

Useful colorants are well known in the art, and include materials such as dyes, stains, and pigments. Examples of suitable colorants include, but are not limited to, phthalocyanine blue (C.I. PIGMENT BLUE), monoarylide yellow, diarylide yellow, arylamide yellow, azo red, quinacridones, magenta and black pigments, such as finely divided carbon, and the like.

Hereinafter, the present invention will be described in greater detail with reference to the following examples. The following examples are for illustrative purposes and are not intended to limit the scope of the invention.

EXAMPLE 1

A charge transport layer was formed as follows: 2 g of a hydrazone-based charge transport material (of the following formula synthesized from U.S. Pat. No. 6,066,426), and 2 g of polycarbonate (PCZ200, Mitsubishi Chemical, Japan) were dissolved in 16 g of tetrahydrofuran (THF), the solution was then filtered using a syringe filter having a pore size of 1 μm, and coated on an aluminum drum at a speed of 300 mm/min using a ring coater, giving a charge transport layer having a thickness of approximately 8 μm.

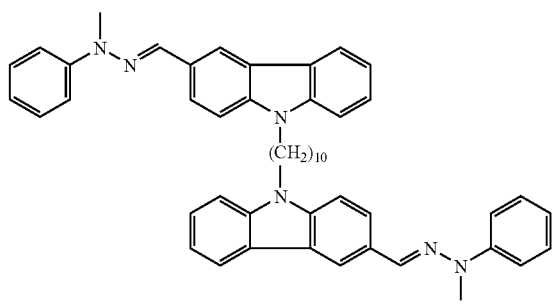

Next, a charge-generating layer is formed as follows. 0.84 g of polyvinylbutyral (BX-1, available from SEKISUI CO., Japan) was dissolved in 17.2 g of ethanol, and then 1.96 g of titanyloxy phthalocyanine (TiOPc, available from H. W. SANDS), as a charge generating material, was mixed to the solution. This mixture was milled in an attrition miller for 1 hour. 4.29 g of the resulting milled dispersion was diluted with 10.1 g of butylacetate and 0.63 g of ethanol and filtered through a syringe filter having an average pore size of 5 μm to provide a charge generating layer coating composition. The coating composition was coated on the charge transport layer at a speed of 250 mm/min using a ring coater, thereby forming a charge generating layer having a thickness of approximately 0.3 μm.

Then, an overcoat layer is formed as follows. 0.3 g of polyaminoether (Blox 205, Dow Chemical), 0.06 g of butyl-9-dicyanomethylenefluorene-4-carboxylate of the following formula, 9.7 g of 1-methoxy-2-propanol (Dowanol-PM) were completely dissolved, giving a coating solution. The coating solution was coated using a ring coater at a speed of 200 mm/min and dried at 120° C. for 20 minutes, thereby obtaining an overcoat layer having a thickness of approximately 1 μm.

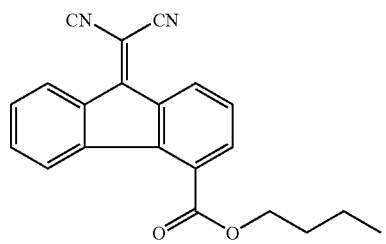

COMPARATIVE EXAMPLE

An organophotoreceptor was manufactured in the same manner as in Example 1 except that 0.3 g of polyaminoether (Blox 205, Dow Chemical) and 9.7 g of 1-methoxy-2-propanol, (Dowanol-PM) were used in preparing the overcoat layer.

The charge potential and the exposure potential of the organic photoreceptors prepared in Example and Comparative Example were measured while repeating 100 charge-exposure-erase cycles, using a drum photoreceptor evaluation apparatus (PDT2000, available from QEA). A corona voltage +8.0 kV was applied to the photoreceptors charged with a relative speed of a charger and the photoreceptor being 100 mm/sec, immediately followed by irradiating monochrome light having a wavelength of 780 nm at a constant exposure energy of 1 mJ/m².

The evaluation result is shown in Table 1.

TABLE 1

| Evaluation item | Example | Comparative Example |
| --- | --- | --- |
| Charge potential (V) | 552 → 550 | 537 → 545 |
| Exposure potential (V) | 103 → 107 | 112 → 119 |
| $E_{1/2}$ (mJ/m²) | 0.327 | 0.367 |
| $E_{200}$ (mJ/m²) | 0.482 | 0.541 |

*: Charge-Exposure-Erase cycling: (1st cycle) → (100th cycle)
$E_{1/2}$: Exposure energy required for exposure potential decaying to a half charge potential
$E_{200}$: Exposure energy required for exposure energy being 200 V Referring to Table 1, the overcoat layer prepared in Example 1, containing butyl-9-dicyanomethylenefluorene-4-carboxylate, showed an initial exposure lower than that of the overcoat layer using polyaminoether without butyl-9-dicyanomethylenefluorene-4-carboxylate of the Comparative Example. Also, in the overcoat layer of the present invention, an increase in exposure potential was not so great in charge-exposure-erase cycling. Further, photosensitivity of the overcoat layer of the present invention, as expressed by a reciprocal number of $E_{1/2}$ or $E_{200}$, was greatly increased.

In an electrophotographic imaging process, since the organophotoreceptor comprising an overcoat layer formed using the overcoat layer forming composition can maintain high charge potential and low residual or discharge potential, the lifetime of the organophotoreceptor can be extended. Also, since the organophotoreceptor according to the present invention has good solvent resistance and abrasion resistance, it can be advantageously used for liquid toner.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A composition for forming an overcoat layer for an organophotoreceptor comprising:
   polyaminoether;
   an electron transport material; and
   an alcoholic solvent,
   wherein the polyaminoether is represented by the following formula, and is contained in an amount of 70 to 99 parts by weight based on 100 parts by weight of the solid content of an overcoat layer:

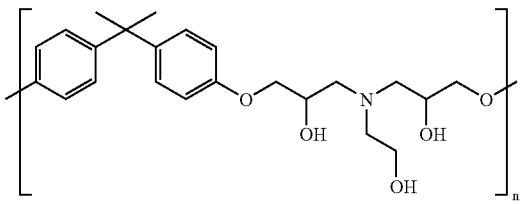

wherein n is an integer from 10 to 400, and
   wherein the amount of the electron transport material is in the range of 1 to 30 parts by weight based on 100 parts by weight of the solid content of an overcoat layer.

2. The composition of claim 1, wherein the polyaminoether is hydroxylated polyaminoether.

3. The composition of claim 1, wherein the electron transport material contains an electron transport material represented by the following formula:

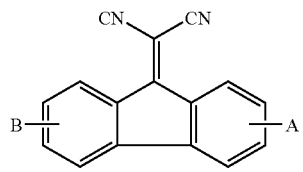

wherein A and B are independently one selected from the group consisting of a hydrogen atom, a halogen atom, a C2~C30 substituted or unsubstituted alkoxycarbonyl group or a C2~C30 substituted or unsubstituted alkylaminocarbonyl group, and the hydrogen atoms in the benzene ring is substitutable by a halogen atom.

4. The composition of claim 1, wherein the alcoholic solvent is at least one selected from the group consisting of 1-methoxy-2-propanol, methanol, ethanol, propanol, butanol and isopropanol, and is contained in an amount of 70 to 99 parts by weight based on 100 parts by weight of the composition for an overcoat layer.

* * * * *